United States Patent
Tachibana

(10) Patent No.: US 8,458,339 B2
(45) Date of Patent: Jun. 4, 2013

(54) COMMUNICATION APPARATUS AND CONTROL METHOD FOR ELECTRONIC PAYMENT SERVICES

(75) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 12/711,099

(22) Filed: Feb. 23, 2010

(65) Prior Publication Data

US 2010/0217705 A1 Aug. 26, 2010

(30) Foreign Application Priority Data

Feb. 26, 2009 (JP) .................................. 2009-044199

(51) Int. Cl.
G06F 15/16 (2006.01)
(52) U.S. Cl.
USPC ....... 709/227; 370/254; 370/395.2; 455/41.2; 705/17
(58) Field of Classification Search
USPC ... 370/254, 395.2; 709/228; 726/4; 455/41.2; 705/17
See application file for complete search history.

(56) References Cited

U.S. PATENT DOCUMENTS

| 2006/0153198 A1* | 7/2006 | Chadha ...................... 370/395.2 |
| 2008/0072292 A1* | 3/2008 | Narjala ............................. 726/4 |
| 2009/0055541 A1* | 2/2009 | Sato et al. ..................... 709/228 |
| 2010/0177663 A1* | 7/2010 | Johansson et al. ............ 370/254 |

FOREIGN PATENT DOCUMENTS

| JP | 2003-44774 A | 2/2003 |
| JP | 2004-192098 A | 7/2004 |
| JP | 2006-166311 A | 6/2006 |
| JP | 2008-004975 A | 1/2008 |

OTHER PUBLICATIONS

Office Action issued on Feb. 5, 2013 in counterpart Japanese Application No. 2009-044199.

* cited by examiner

*Primary Examiner* — Dustin Nguyen
(74) *Attorney, Agent, or Firm* — Carter, DeLuca, Farrell & Schmidt LLP

(57) ABSTRACT

A communication apparatus includes an electronic payment unit configured to perform electronic payment processing via a short-range wireless communication, an acquisition unit configured to acquire, via the short-range wireless communication, a service parameter required for utilizing a public wireless local area network (LAN) service, by performing the electronic payment processing, and a transfer unit configured to transfer the acquired service parameter to a second communication apparatus.

13 Claims, 11 Drawing Sheets

COMMUNICATION APPARATUS AND CONTROL METHOD FOR ELECTRONIC PAYMENT SERVICES

BACKGROUND OF THE INVENTION

1. Field of the Invention

The present invention relates to a communication apparatus, a control method for the communication apparatus, and a program for causing a computer to execute the control method.

2. Description of the Related Art

Electronic payment services using short-range wireless communication technology (contactless communication technology), such as Felica® or near field communication, have become increasingly common, and electronic payment functions using the short-range wireless communications begin to be installed on a majority of mobile telephones.

Also, in recent years, service areas of public wireless local area network (LAN) services have expanded. Public wireless LAN service refers to a service that is connected via a wireless LAN to access points (APs) placed at railway stations, airports, hotels, restaurants, and so forth, and is connectable to the Internet via the APs. Such a service, for example, is provided by NTT Communications Corporation under the name of HOTSPOT®.

HOTSPOT® includes a service configuration called 1 DAY PASSPORT. The 1 DAY PASSPORT service will be briefly described below. When a user pays money at a shop such as a convenience store, a card on which a service parameter necessary for utilizing the hotspot service is described, is passed at a cash register. Service parameters include service set identifiers (SSIDs), encryption keys for wirelessly connecting to public wireless LAN-compliant access points, and user IDs and passwords for logging in the public wireless LAN services, and so forth. A user inputs and sets a service parameter to an apparatus to be utilized, when connecting to a hotspot-compliant AP, which thereby enables the user to utilize the hotspot service.

Japanese Patent Application Laid-Open No. 2003-44774 discusses a system that enables a user to receive provision of a service, by performing electronic payment processing using the short-range wireless communication of a mobile telephone when using a service providing apparatus, such as an amusement machine or coin laundry equipment.

Japanese Patent Application Laid-Open No. 2004-192098 discusses connecting wireless LAN service business operators and mobile telephone business operators to one another via a network, whereby a user can utilize a public wireless LAN service via a mobile telephone and a charging is performed using a charging system of the mobile telephone business operator.

U.S. Patent Application Publication No. 2005/0207378 discusses that utilization tickets, in which service parameters required for utilizing public wireless LAN services are stored in a memory, are issued from ticket issuing machines, and service parameters are transmitted to mobile telephones by the short-range wireless communication.

However, in each of the Patent Documents described above, a system for synchronizing an electronic payment function using the short-range wireless communication of mobile telephones with an issuance of the service parameters required for utilizing the public wireless LAN services is not considered.

In addition to mobile telephones, devices for utilizing public wireless LAN services include digital cameras and notebook personal computers (PCs). However, these devices are not typically provided with an electronic payment function using the short-range wireless communication.

Further, it is a very cumbersome task for users to input the service parameters to the digital cameras or the like.

SUMMARY OF THE INVENTION

The present invention is directed to a method for enabling a user to acquire, in a straightforward manner, service parameters required for utilizing public wireless LAN services.

According to an aspect of the present invention, a communication apparatus includes an electronic payment unit configured to perform electronic payment processing via a short-range wireless communication, an acquisition unit configured to acquire, via the short-range wireless communication, a service parameter required for utilizing a public wireless LAN service, by performing the electronic payment processing, and a transfer unit configured to transfer the acquired service parameter to a second communication apparatus.

According to another aspect of the present invention, a method for controlling a communication apparatus having an electronic payment function for performing electronic payment processing via a short-range wireless communication includes acquiring, via the short-range wireless communication, a service parameter required for utilizing a public wireless LAN service by performing the electronic payment processing, and transferring the acquired service parameter to a second communication apparatus.

According to yet another aspect of the present invention, a communication apparatus includes an electronic payment unit configured to perform electronic payment processing via a contactless communication, an acquisition unit configured to acquire, via the contactless communication, a service parameter required for utilizing a public wireless LAN service, by performing the electronic payment processing, and a setting unit configured to set a service parameter acquired by the acquisition unit, for utilizing the public wireless LAN service.

According to yet another aspect of the present invention, a method for controlling a communication apparatus having an electronic payment function for performing electronic payment processing via a contactless communication includes acquiring, via the contactless communication, a service parameter required for utilizing a public wireless LAN service by performing the electronic payment processing, and utilizing the public wireless LAN service by using the acquired service parameter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A hardware configuration according to exemplary embodiments of the present invention will be described below. Hereinbelow, an example using a wireless LAN system conforming to the IEEE 802.11 series is described, however the communication configuration is not limited to the wireless LAN conforming to the IEEE 802.11 and other wireless communication standards can be utilized.

Figure 1:
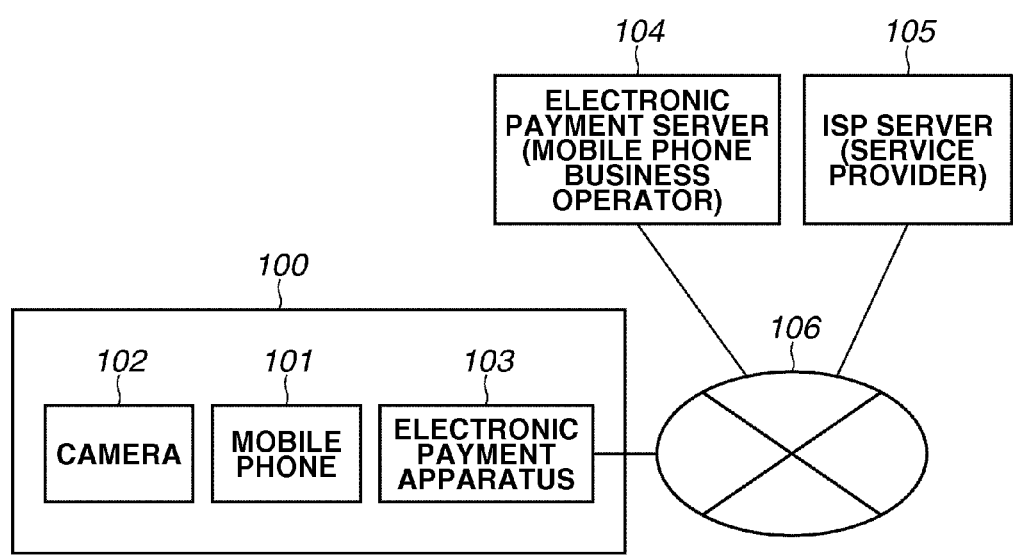
FIG. 1 illustrates a system configuration according to a first exemplary embodiment of the present invention.

FIG. 1 illustrates a system configuration according to a first exemplary embodiment of the present invention. In FIG. 1, a mobile telephone 101 serves as a wireless communication apparatus in a convenience store 100. The mobile telephone 101 includes each wireless communication interface of a wireless LAN conforming to the IEEE 802.11 (hereinafter, "wireless LAN"), and a short-range wireless communication (contactless communication). In the present exemplary embodiment, description will be given based on the assumption that the mobile telephone 101 includes a near field communication (hereinafter, "NFC") as the short-range wireless communication function.

Also, the mobile telephone 101 has a wireless parameter setting function of automatically setting various wireless communication parameters (hereinafter, "wireless parameters") such as network identifiers (SSIDs) necessary for the connection of the wireless LANs, frequency channels, encryption keys, and authentication keys. In the present exemplary embodiment, description will be given based on the assumption that the mobile telephone 101 has a Wireless Fidelity (Wi-Fi) Protected Setup (hereinafter, "WPS") as the wireless parameter setting function. The WPS is a wireless parameter setting function in an infrastructure mode in which communication apparatuses wirelessly communicate with one another via access points (base stations). On the other hand, in the present exemplary embodiment, description will be given based on the assumption that the WPS is applied to an ad-hoc mode in which communication apparatuses are operable to directly wirelessly communicate with one another. In a case where the wireless parameter setting is performed by the WPS in the ad-hoc mode, the provision of wireless parameters is performed by either one device becoming a providing apparatus for the wireless parameters, and the other device becoming a receiving apparatus for the wireless parameters. Then, the wireless communication by the ad-hoc mode is enabled by using the wireless parameters shared between the providing apparatus and the receiving apparatus for the wireless parameters. In the WPS, a providing apparatus is called a Registrar, and a receiving apparatus is called an Enrollee. When the wireless parameters are provided from the providing apparatus to the receiving apparatus, Registration Protocol specified by the WPS is assumed to be used. The mobile telephone 101 is able to build a network for collecting information about nearby wireless communication apparatuses, and a network for executing wireless parameter setting.

A camera 102 is another communication apparatus. The camera 102 has a wireless LAN as a wireless communication function. Also, the camera 102 has a wireless parameter setting function of automatically setting wireless parameters necessary for connection of the wireless LAN. In the present exemplary embodiment, description will be given based on the assumption that the camera 102 has the WPS as the wireless parameter setting function.

An electronic payment apparatus 103 has a short-range wireless communication function. The electronic payment apparatus 103 is operable to communicate with the mobile telephone 101 using the short-range wireless communication function. In the present exemplary embodiment, description will be given based on the assumption that the electronic payment apparatus 103 has the NFC as the short-range wireless communication function. Also, the electronic payment apparatus 103 is connected to a network 106, and operable to communicate with an electronic payment server 104 and an Internet service provider (ISP) server 105 via the network 106.

An electronic payment server 104, which is managed by a mobile telephone business operator, manages electronic payment information of mobile telephone users. Also, the electronic payment server 104 is operable to communicate with the electronic payment apparatus 103 and the ISP server 105 via the network 106. The electronic payment server 104 executes substitutional electronic payment to the ISP server 105, on behalf of the mobile telephone users.

The ISP server 105, which is managed by a public wireless LAN service provider, manages service parameters required for utilizing public wireless LAN services. Service parameters include SSIDs for wirelessly connecting to public wireless LAN-compliant access points, encryption keys, and user IDs and passwords for logging in the public wireless LAN services. Besides, charging information, position information, and the like may be managed as the service parameters. Also, the ISP server 105 is operable to communicate with the electronic payment apparatus 103 and the electronic payment server 104 via the network 106.

The electronic payment apparatus 103, the electronic payment server 104, and the ISP server 105 are connected to one another via the network 106 such as the Internet. The electronic payment apparatus 103, the electronic payment server 104, and the ISP server 105 transmit and receive service information and user information of mobile telephones via the network 106.

Figure 2:
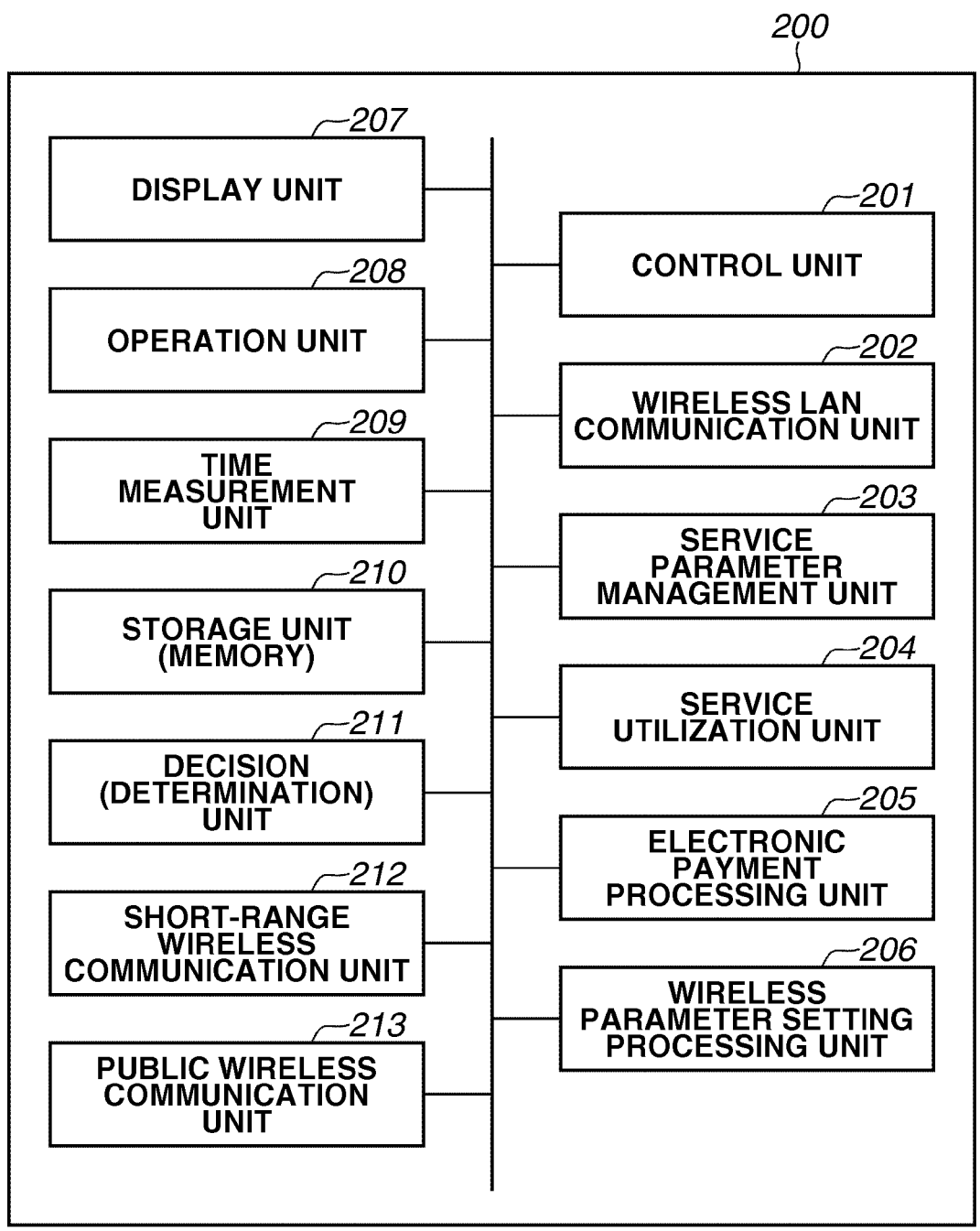
FIG. 2 illustrates a block configuration of a mobile telephone.

FIG. 2 is a block configuration diagram of the mobile telephone 101 as a wireless communication apparatus. In FIG. 2, the entire mobile telephone 200 is illustrated. A control unit 201 controls various operations of the mobile telephone 101.

A wireless LAN communication unit 202 for performing communication control of the wireless LAN performs construction of a network in the wireless LAN, connection processing to other communication apparatuses, and search processing for other communication apparatuses.

A service parameter management unit 203 manages the service parameters necessary for utilization of the public wireless LAN services. A service utilization unit 204 performs processing for utilizing the public wireless LAN services using the service parameters. An electronic payment processing unit 205 manages electronic payment processing.

A wireless parameter setting processing unit 206 performs automatic settings of the wireless parameters necessary for connection of the wireless LANs.

A display unit 207 displays various pieces of information. An operation unit 208 performs various instructions such as telephone calls, and photographing operations. When a button manipulation for instructing the start of the wireless parameter setting processing by the operation unit 208, the wireless parameter setting processing unit 206 activates the WPS, and starts automatic setting processing of the wireless parameters. Further, even in a case where transfer instruction of the service parameters or acquisition instruction of the service parameters is performed by the operation unit 208, the wireless parameter setting processing unit 206 activates the WPS.

A time measurement unit 209 manages timers. A storage unit (memory) 210 stores the service parameters, and other various setting information and the like. Also, the storage unit 210 stores identification information (MAC address) of an apparatus to which transfer of the service parameters is permitted (hereinafter, "registration apparatus"). In the present exemplary embodiment, identification information of the camera 102 is assumed to be stored. Device type information (mobile telephones, camera, PCs, etc.) of apparatuses, to which the transfer of the service parameters is permitted, may have been previously stored. Information of apparatuses, to which the transfer of the service parameters is prohibited, may have been previously stored in the storage unit 210.

A determination unit 211 performs determination processing such as whether to transfer the service parameters, and whether to use the service parameters in the apparatus itself, whether to discard the service parameters.

A short-range wireless communication unit 212 performs detection processing of an opposing (partner) apparatus by the NFC, and connection processing with the opposing apparatus, data communication with the connected opposing apparatus and the like. A public wireless communication unit 213 performs communication control in the public network (mobile telephone network).

The above-described functional block configuration is an example, but a plurality of functional blocks may be configured to constitute one functional block, or either functional block may be divided into blocks that additionally perform a plurality of functions.

In the first exemplary embodiment, description will be given of the processing since the mobile telephone 101 acquires service parameters necessary for utilizing a public wireless LAN service by performing the electronic payment processing, until the mobile telephone 101 transfers the service parameters to the camera 102 stored as a registration apparatus.

Figure 3:
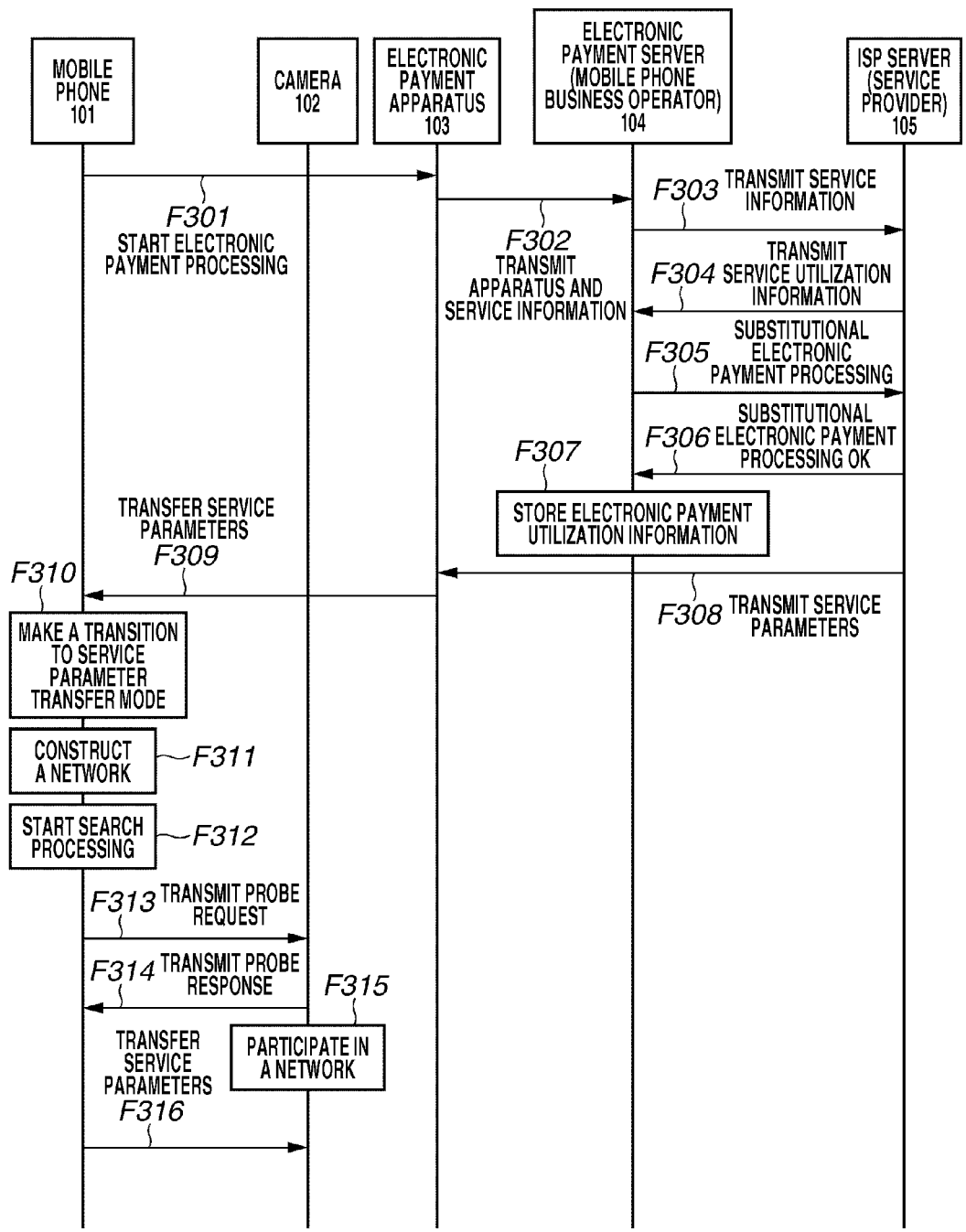
FIG. 3 illustrates a sequence according to the first exemplary embodiment.

FIG. 3 is a sequence diagram according to the present exemplary embodiment.

A user who intends to utilize a public wireless LAN service, firstly initiates electronic payment processing by using the mobile telephone 101. For example, when the user holds his or her mobile telephone 101 over an electronic payment apparatus, the short-range wireless communication unit 212 detects the electronic payment apparatus and then the electronic payment processing is initiated. Further, in the mobile telephone 101, when the electronic payment instruction is performed by activating the electronic payment application and performing operation by the operation unit 208, the electronic payment processing may be initiated.

In step F301, when the electronic payment processing is initiated, the mobile telephone 101 transmits user information to the electronic payment apparatus 103. The user information is information to identify a user of the mobile telephone 101. For example, telephone number and mobile telephone business operator information may be named. Further, the user operates a user interface (UI) of the electronic payment apparatus 103, to input (select) service information including a service type (public wireless LAN service in the present exemplary embodiment) and information pertaining to a business operator that provides services, shop information, and charge information. In a case where the service information has been stored in advance in the mobile telephone 101, the service information may be transmitted together with the user information in step F301. In this case, the UI operation of the electronic payment apparatus 103 by the user may be omitted.

On receiving user information transmitted from the mobile telephone 101, the electronic payment apparatus 103 connects to the electronic payment server 104 based on the user information transmitted from the mobile telephone 101. In step F302, the electronic payment apparatus 103 transmits the service information input by the user and the user information transmitted from the mobile telephone 101 to the electronic payment server 104.

In step F303, the electronic payment server 104 connects to the ISP server 105 based on the service information to transmit the service information thereto. In step F304, the ISP server 105, on receiving the service information, then determines whether it is possible to provide service parameters required for utilizing the service, and transmits a determination result to the electronic payment server 104.

In step F305, on receiving a reply that it is possible to provide the service parameters from the ISP server 105, the electronic payment server 104 performs substitutional processing for the electronic payment. In step F306, the ISP server 105 transmits a result of the substitutional processing for the electronic payment to the electronic payment server 104. In step F307, on receiving the reply from the ISP server 105 that the substitutional processing for the electronic payment has been successfully performed, the electronic payment server 104 stores an event of having executed substitutional electronic payment for the user of the mobile telephone 101.

On successfully completing the substitutional electronic payment processing, the ISP server 105 transmits the service parameters to the electronic payment apparatus 103, referring to the service information transmitted by the electronic payment server 104 in step F303. At this time, in step F308, the ISP server 105 may transmit the service parameters with added restriction information thereto. Restriction information refers to, for example, information indicating the number of times that the service parameters can be transferred, and information indicating a length of time during which the service parameters can be utilized.

In step F309, the electronic payment apparatus 103 transmits (transfers) the service parameters received from the ISP server 105 to the mobile telephone 101 by the short-range wireless communication. In step F310, the mobile telephone 101, on receiving the service parameters, then makes a transition to the service parameter transfer mode, and activates the WPS acting as the wireless parameter setting function. In the present exemplary embodiment, the service parameters are transferred by adding the service parameters to an option field of the WPS, using the Registration Protocol of the WPS. Though not illustrated, in the camera 102, an instruction operation for acquiring the service parameters by the user is performed, as a result of which the WPS is assumed to be activated. If it is a usual case, when the WPS is activated in the mobile telephone 101 and the camera 102, there is performed processing for providing wireless parameters required for communicating in the ad-hoc mode between the mobile telephone 101 and the camera 102. On the other hand, in step F310, if the WPS is activated, there is performed transfer processing of the service parameters necessary for utilization of the public wireless LAN service from the camera 102.

In step F311, the mobile telephone 101, which has activated the WPS, sets a role of the apparatus itself to a providing apparatus of the wireless parameters, and constructs a network for wireless parameter setting, namely, for service parameter transfer. Then, in step F312, the mobile telephone 101 starts processing to search for nearby wireless communication apparatuses. In the present exemplary embodiment, an active scan, in which the mobile telephone 101 waits for a given period of time since a Probe Request is transmitted until a Probe Response is transmitted, is assumed to be used. The Probe Request added with information indicating that the WPS is running (wireless parameter setting processing is being executed), and information indicating that a role is a providing apparatus of the wireless parameter is transmitted. If another wireless communication apparatus, which has received the Probe Request, is running the WPS, it transmits the Probe Response added with information indicating that the WPS is running. If another wireless communication apparatus, which has received the Probe Request, is not running the WPS, it transmits the Probe Response not added with information indicating that the WPS is running. As s search processing, a passive scan, in which the mobile telephone 101 waits for reception of a beacon for a given period of time, may be used, or a combination of the active scan and the passive scan may be acceptable.

In step F313, the camera 102 receives the Probe Request transmitted from the mobile telephone 101. In step F314 the camera 102 transmits the Probe Response added with information indicating that the WPS is running. The mobile telephone 101 can determine whether another wireless communication apparatus, which is running the WPS, exists by referring to the received Probe Response. Further, in step F315, the camera 102 recognizes that the mobile telephone 101 is determined as a providing apparatus, and participates in a network, which the mobile telephone 101 has constructed.

On detecting that the camera 102 has participated in the network, the mobile telephone 101 determines whether the camera 102 is a registration apparatus based on the information stored in the storage unit 210. In the present exemplary embodiment, in step F316, since the camera 102 is the registration apparatus, the mobile telephone 101 transfers the service parameters to the camera 102 using the Registration Protocol of the WPS.

Figure 4:
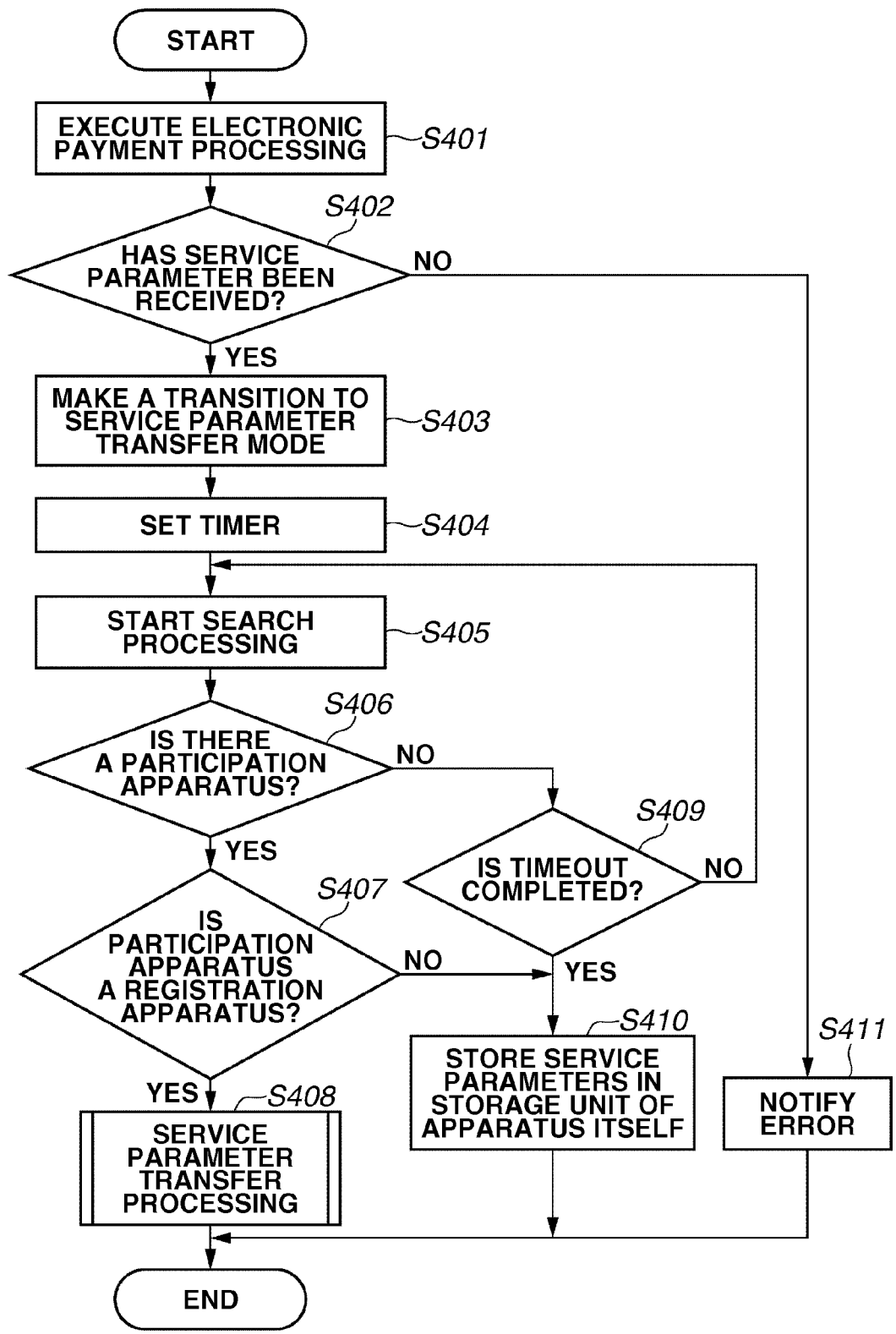
FIG. 4 is a flowchart for the mobile telephone according to the first exemplary embodiment.

FIG. 4 illustrates an operation processing flow of the mobile telephone 101 according to the present exemplary embodiment. With reference to the operation processing flow, the sequence illustrated in FIG. 3 will be described from viewpoint of an operation of the mobile telephone 101.

Firstly, in step S401, the mobile telephone 101 executes electronic payment processing using the short-range wireless communication unit 212. In step S402, when the electronic payment processing is completed, the mobile telephone 101 determines whether a service parameter has been received from the electronic payment apparatus 103. In step S411, if the mobile telephone 101 fails to receive the service parameter (NO in step S402), a reception error of the service parameter is displayed on the display unit 207. In step S403, on receiving the service parameter (YES in step S402), the mobile telephone 101 makes a transition to the service parameter transfer mode. In the present exemplary embodiment, the WPS acting as the wireless parameter setting function is activated. Further, at this time, the mobile telephone 101 sets a role of the apparatus itself to a providing apparatus of the wireless parameter. Usually, if the WPS is activated in the mobile telephone 101 and the camera 102, there is performed processing for providing the wireless parameter required for establishing communication in the ad-hoc mode between the mobile telephone 101 and the camera 102. On the other hand, if the WPS is activated in step S403, there is performed transfer processing of the service parameters necessary for utilizing the public wireless LAN service from the camera 102. Then, in step S404, the mobile telephone 101 sets up a timer for measuring a duration time required to search for nearby wireless communication apparatuses. The timer may be set up by a user, or may have been set up in advance in the mobile telephone 101.

In step S405, the mobile telephone 101 constructs a network for wireless parameter setting, namely, for service parameter transfer, and starts search processing for nearby wireless communication apparatuses.

Then, in step S406, the mobile telephone 101 determines whether another wireless communication apparatus has participated in a network for wireless parameter setting, namely, for service parameter transfer. If the mobile telephone 101 determines that a wireless communication apparatus (hereinafter, "participation apparatus"), which has participated in the network for service parameter transfer, exists (YES in step S406), the processing proceeds to step S407. If it is determined that a participation apparatus does not exist (NO in step S406), then the mobile telephone 101 performs search processing in step S405, until the timer, which has been set up in step S404, expires (NO in step S409) in step S409. If the timer expires while the participation apparatus remains undetectable (YES in step S409), then in step S410, the mobile telephone 101 stores the service parameters in the storage unit 210, and ends the processing.

In step S407, the mobile telephone 101 determines whether the participation apparatus is a registration apparatus. Determination whether the participation apparatus is a registration apparatus is performed by comparing information acquired from the participation apparatus with information previously stored in the storage unit 210. It may be determined whether identification information such as, for example, a media access control (MAC) address, matches with each other, or may be determined whether device type information of cameras, PCs matches with each other.

Figure 11:
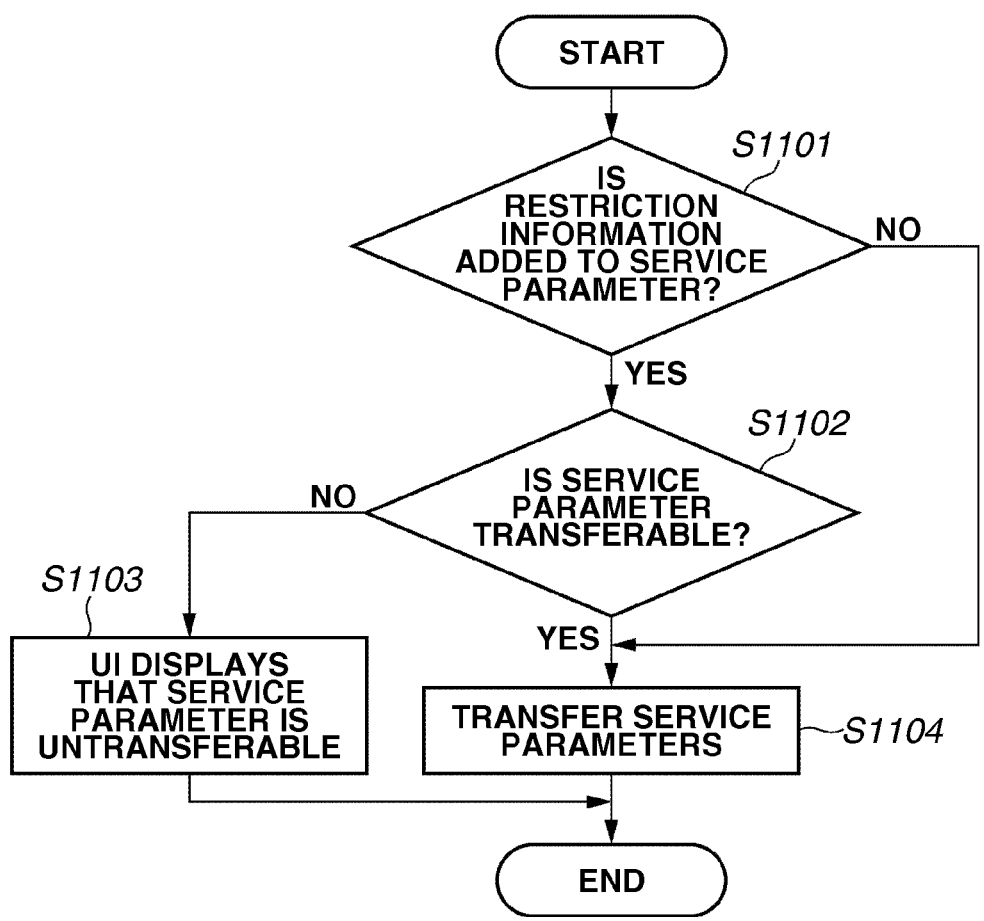
FIG. 11 is a flowchart of transfer processing of service parameters.

If the mobile telephone 101 determines that the participation apparatus is a registration apparatus (YES in step S407), then in step S408, the mobile telephone 101 performs service parameter transfer processing to the participation apparatus (the details will be described below in FIG. 11). If the mobile telephone 101 determines that the participation apparatus is not a registration apparatus (NO in step S407), then in step S410, the mobile telephone stores the service parameter in the storage unit 210 of the apparatus itself, and ends the processing.

Now, service parameter transfer processing of step S408 will be described with reference to the flowchart illustrated in FIG. 11.

In step S1101, the mobile telephone 101 checks whether restriction information is added to the service parameter. If the restriction information is added (YES in step S1101), then in step S1102, the mobile telephone 101 determines whether the service parameter is transferable, based on the restriction information. For example, if an allowable number of times of transfer is added as the restriction information, it is determined whether the number of times of transfer is larger than the allowable number of times of transfer. If the allowable number of times of transfer is add to the service parameter, information indicating the number of times of actual transfer is also added thereto. Further, information indicating the number of times of transfer is assumed to be updated each time the service parameter is transferred.

In step S1103, if the number of times of transfer is larger than the allowable number of times of transfer, the display unit 207 notifies the user that the service parameter is untransferable (NO in step S1102). In this case, the service parameter management unit 203 may store the service parameter in the storage unit 210 as a service parameter that is used by the apparatus itself.

If restriction information is not added to the service parameter, or the number of times of transfer is smaller than the allowable number of times of transfer (NO in step S1101), then in step S1104, the mobile telephone 101 transfers the service parameter to the participation apparatus using the Registration Protocol of the WPS.

As described above, according to the present exemplary embodiment, the mobile telephone 101 can transfer the service parameter acquired by performing electronic payment processing to another communication apparatus by using the protocol of the WPS. Therefore, the other communication apparatus, even if it does not have an electronic payment function by the short-range wireless communication, is operable to acquire in a straightforward manner a service parameter required for utilizing a public wireless LAN service, as long as it has the WPS. As a result, time and task for the user to input the service parameter to a device can be saved, thus improving the user's convenience.

Further, in the above descriptions, transfer of service parameters using the WPS has been described. If the camera 102 has the short-range wireless communication function by an NFC, the service parameters may be transferred by the NFC. In the case of the NFC, if devices do not come closer to each other within several centimeters, they are not operable to communicate with each other. Consequently, the user's intention that "he or she wants to transfer the service parameter to the device" is likely to be reflected. Therefore, when the NFC is used, the service parameters may be transferred, regardless of whether a transfer destination is a registration apparatus. Further, in order to ensure security, transfer of the service parameters by the NFC may be permitted only for a predetermined period of time since a transition has been made to the service parameter transfer mode.

Further, a transfer function of the service parameter by the WPS and the NFC may be activated in parallel with each other. For example, if a transition is made to the service parameter transfer mode in step S403 in FIG. 4, the WPS is activated, and transfer of the service parameters by the NFC may be enabled for a predetermined period of time as well. Another communication apparatus, which desires to acquire the service parameters by doing so, is operable to select which of the WPS and the NFC to use for acquiring the service parameters, depending on the function that the apparatus itself has.

In a second exemplary embodiment of the present invention, a case where a mobile telephone utilizes a service parameter acquired by performing an electronic payment processing, and utilizes a public wireless LAN service, will be described below.

Figure 5:
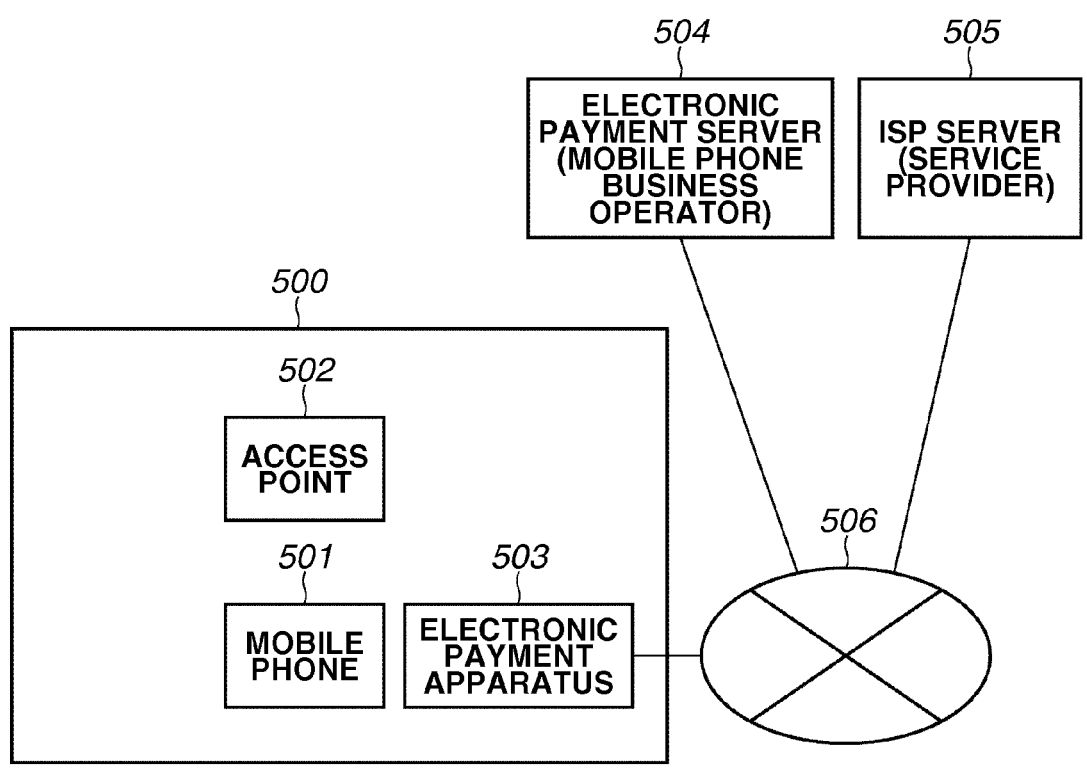
FIG. 5 illustrates a system configuration according to a second exemplary embodiment of the present invention.

FIG. 5 is a system configuration diagram according to the present exemplary embodiment. In FIG. 5, a mobile telephone 501 serves as a wireless communication apparatus within a public wireless LAN service area 500 of an airport. The mobile telephone 501 is similar to the mobile telephone 101 illustrated in FIG. 1, and description thereof will be omitted. An access point 502 is compliant with public wireless LAN services.

An electronic payment apparatus 503 is similar to the electronic payment apparatus 103 illustrated in FIG. 1, and description thereof will be omitted. An electronic payment server 504 is similar to the electronic payment server 104 illustrated in FIG. 1, and description thereof will be omitted. An ISP server 505 is similar to the ISP server 105 illustrated in FIG. 1, and description thereof will be omitted. Via a network 506 such as the Internet, the electronic payment apparatus 503, the electronic payment server 504, and the ISP server 505 are connected to one another.

A block configuration diagram of the mobile telephone 501 is similar to that in FIG. 2, and description thereof will be omitted.

Figure 6:
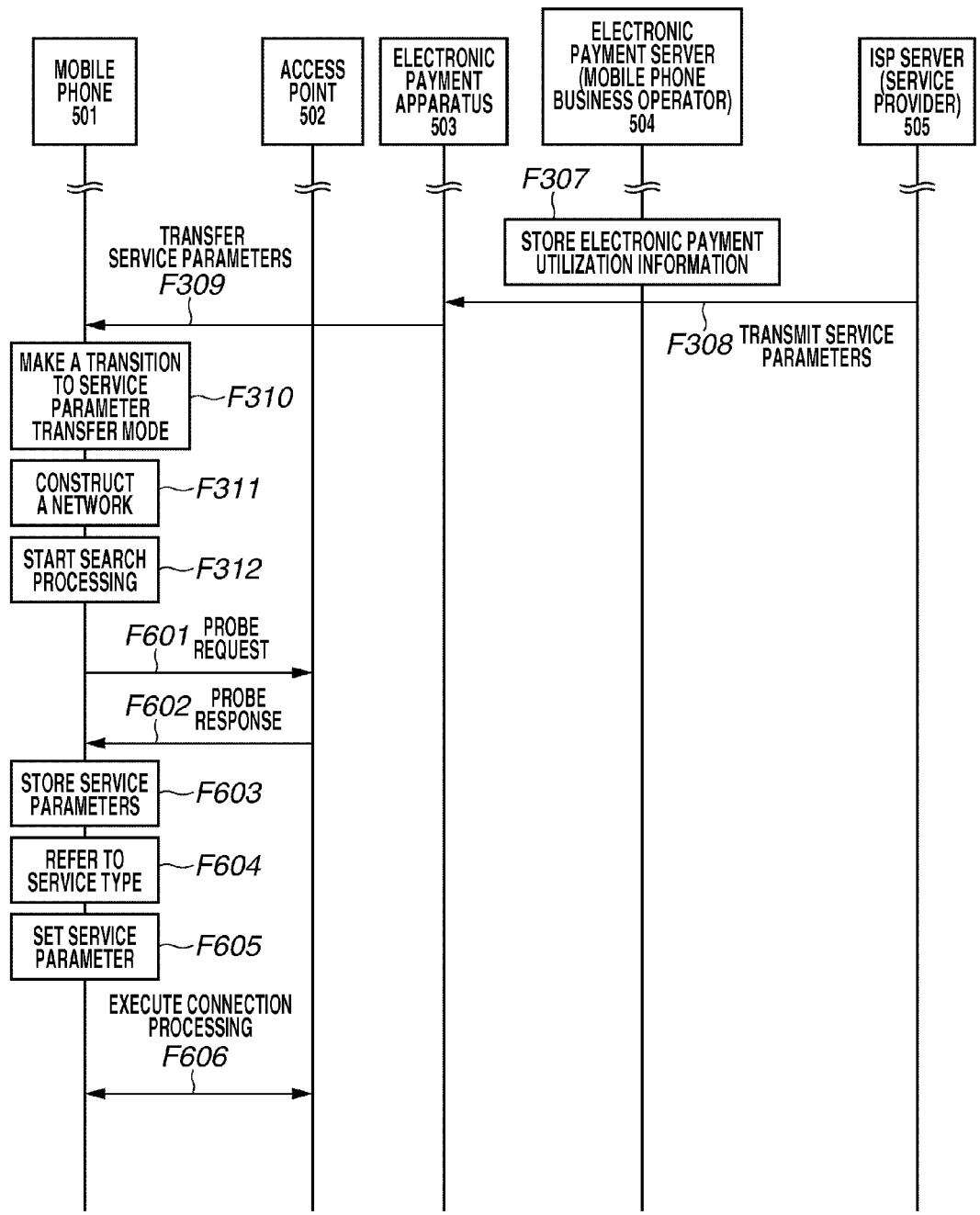
FIG. 6 illustrates a sequence according to the second exemplary embodiment.

FIG. 6 is a sequence diagram according to the present exemplary embodiment. A sequence up to step F312 is similar to that in FIG. 3, and description will be omitted.

In step F601, the mobile telephone 501 transmits a Probe Request with added information thereto. The added information includes information indicating that the WPS is running (wireless parameter setting is being executed), and information indicating that a role of the apparatus itself is set to a providing apparatus of wireless parameters. In step F602, on receiving the Probe Request, the access point 502 transmits a Probe Response. Since the access point 502 is not running the WPS, information indicating that the WPS is running is not added to the Probe Response, but information indicating that a public wireless LAN-compliant access point is added thereto. In this case, since any wireless communication apparatus that is running the WPS does not exist, other than the mobile telephone 501, the mobile telephone 501 does not transfer the service parameters to another wireless communication apparatus. Instead, in step F603, the mobile telephone 501 stores the service parameters in the storage unit 210.

In step F604, the mobile telephone 501 refers to a service type of the stored service parameters. In the present exemplary embodiment, a service type of service parameters is a public wireless LAN service. In step F605, since the mobile telephone 501 detects that the public wireless LAN-compliant access point 502 exists in the neighborhood in step F602, the mobile telephone 501 sets the stored service parameters to the apparatus itself. Then, in step F606, the mobile telephone 501 wirelessly connects to the public wireless LAN-compliant access point 502 by utilizing the set service parameters. Accordingly, the public wireless LAN service can be utilized from the mobile telephone 501.

Figure 7:
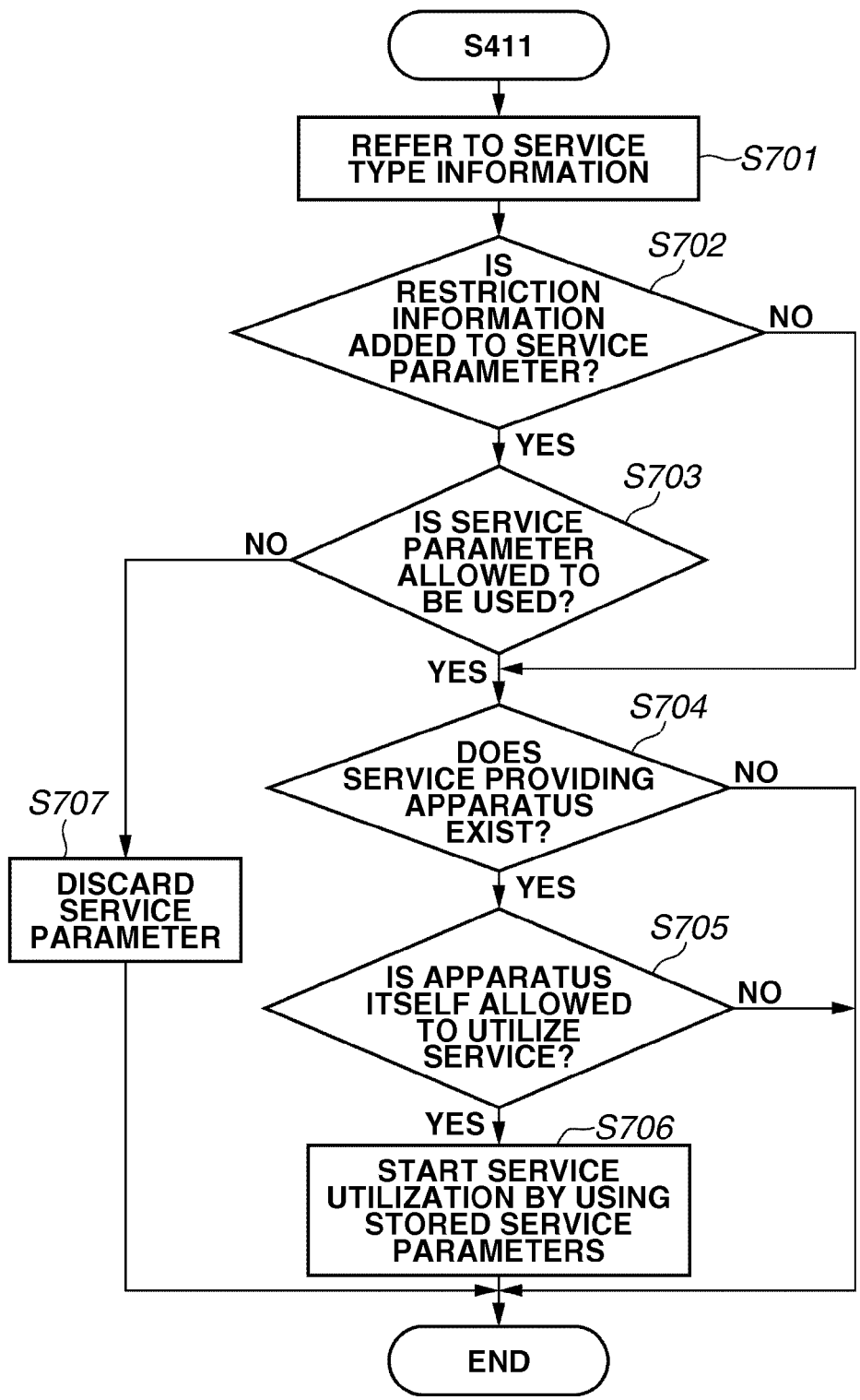
FIG. 7 is a flowchart for the mobile telephone according to the second exemplary embodiment.

FIG. 4 and FIG. 7 are flowcharts of operation processing of the mobile telephone 501 according to the present exemplary embodiment. With reference to the operation processing flow, a sequence as illustrated in FIG. 6 will be described below from viewpoint of an operation of the mobile telephone 501.

If the mobile telephone 501 performs processing in FIG. 4, the processing proceeds to step S410, but does not end the processing. Then, the processing proceeds to the sequence illustrated in FIG. 7. Steps S401 through S409 and S411 in FIG. 4 have been described in the first exemplary embodiment, and description thereof will be omitted herein.

In step S701, the mobile telephone 501, which has stored the service parameter in the storage unit 210 in step in S410, refers to service type information of the stored service parameters. In the present exemplary embodiment, a service type of service parameters is a public wireless LAN service.

Next, in step S702, the mobile telephone 101 checks whether restriction information is added to a service parameter. If the restriction information is added (YES in step 702), then in step S703, the mobile telephone 101 determines whether the service parameter is allowed to be used, based on the restriction information. For example, if a utilizable time is added as restriction information, it is determined whether a utilized time exceeds a utilizable time. If the utilizable time is added to the service parameter, information indicating actual utilized time is also added thereto, and information indicating the utilized time is assumed to be updated each time the service parameter is utilized.

If the utilized time exceeds the utilizable time (NO in step S703), the mobile telephone 101 notifies a user that the service parameter is non-utilizable by the display unit 207. Then in step S707, the mobile telephone 101 discards the service parameter. If restriction information is not added to the service parameter (NO in step S702), or the utilized time does not exceed the utilizable time, the processing proceeds to step S704.

In step S704, the mobile telephone 501 determines whether a service providing apparatus exists. The service providing apparatus provides a service of the service type, to which the mobile telephone 501 referred to. In the present exemplary embodiment, the public wireless LAN-compliant access point 502 corresponds to the service providing apparatus. To determine whether a service providing apparatus exists, the mobile telephone 501 may use a result of the search processing performed in step S405 in FIG. 4, or may separately search for whether the service providing apparatus exists.

If the mobile telephone 501 determines that a service providing apparatus does not exist (NO in step S704), the mobile telephone 501 ends the processing while keeping storing the service parameters. If the mobile telephone 501 determines that a service providing apparatus exists (YES in step S704), then in step S705, the mobile telephone 501 checks whether the apparatus itself is allowed to utilize a service. If the apparatus itself is not allowed to utilize the service (NO in step S705), the mobile telephone 501 ends the processing. If the apparatus itself is allowed to utilize the service (YES in step S705), then in step S706, the mobile telephone 501 starts to utilize the service by setting the stored service parameters to the apparatus itself. That is, the mobile telephone 501 wirelessly connects to the public wireless LAN-compliant access point 502, and performs access to the Internet via the access point.

In this way, according to the present exemplary embodiment, if an apparatus of transfer destination does not exist, when the mobile telephone 501 acquires a service parameter by performing electronic payment processing, the mobile telephone 501 can utilize a public wireless LAN service by itself by using the service parameter.

When a service parameter has been acquired, it is not always needed to shift to the service parameter transfer mode. That is, if a service parameter has been received in step S402 in FIG. 4, the processing may proceed to step S701 in FIG. 7 without proceeding to step S403. When a service parameter is acquired, the service parameter may be set to the mobile telephone just as it is, as a result of which it may start utilization of a public wireless LAN service. By doing so, the mobile telephone can immediately connect to the public wireless LAN, only by performing electronic payment processing via the short-range wireless communication of the mobile telephone. As a result, a time and task when a user inputs service parameters can be dispensed with. Further, when the service parameters are acquired, the service parameters may be temporarily stored in the storage unit 210, and the service parameters may be set according to an instruction by the user to start utilization of the public wireless LAN service. By doing so, if a service parameter has been once acquired by performing electronic payment processing at a convenience store or the like, the public wireless LAN service can be utilized at any time when necessary.

In a third exemplary embodiment of the present invention, a case where, when service parameters acquired by performing electronic payment processing have not been immediately transferred to another wireless communication apparatus, the service parameters will be transferred to the other wireless communication apparatus according to a user's instruction later on will be described below.

Figure 8:
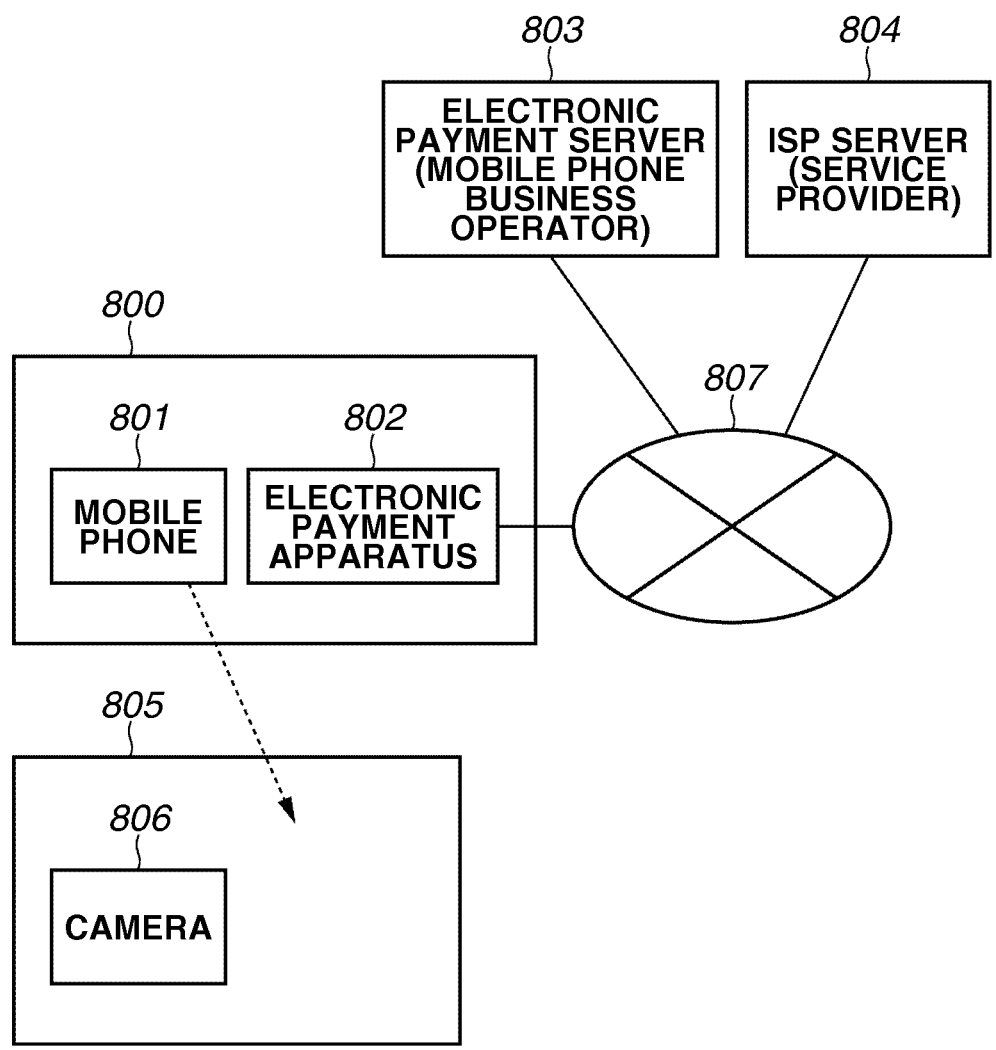
FIG. 8 illustrates a system configuration according to a third exemplary embodiment of the present invention.

FIG. 8 is a system configuration diagram according to the present exemplary embodiment. In FIG. 8, a mobile telephone 801 serves as a wireless communication apparatus within a convenience store 800. The mobile telephone 801 is similar to the mobile telephone 101 in FIG. 1, and description thereof will be omitted.

An electronic payment apparatus 802 is similar to the electronic payment apparatus 103 illustrated in FIG. 1, and description will be omitted. An electronic payment server 803 is similar to the electronic payment server 104 illustrated in FIG. 1, and description will be omitted. An ISP server 804 is similar to the ISP server 105 described in the first exemplary embodiment, and description will be omitted.

A camera 806 serves as another wireless communication apparatus within a home 805, and has the similar function to that of the camera 102 illustrated in FIG. 1. Via a network 807 such as the Internet, the electronic payment apparatus 802, the electronic payment server 803, and the ISP server 804 are connected to one another.

The block configuration diagram of the mobile telephone 801 is similar to that in FIG. 2, and description thereof will be omitted.

In the third exemplary embodiment, service parameters are received by performing electronic payment processing from the mobile telephone 801 in the convenience store 800. The mobile telephone 801 makes a transition to the service parameter transfer mode, but another wireless communication apparatus, to which the service parameters are to be transferred, may not exist. Therefore, in such as case, the service parameters are temporarily stored in the apparatus itself. Description will be given of the process since a user moves to the home 805 afterward, until the service parameters are transferred to the camera 806 acting as a registration apparatus.

Figure 9:
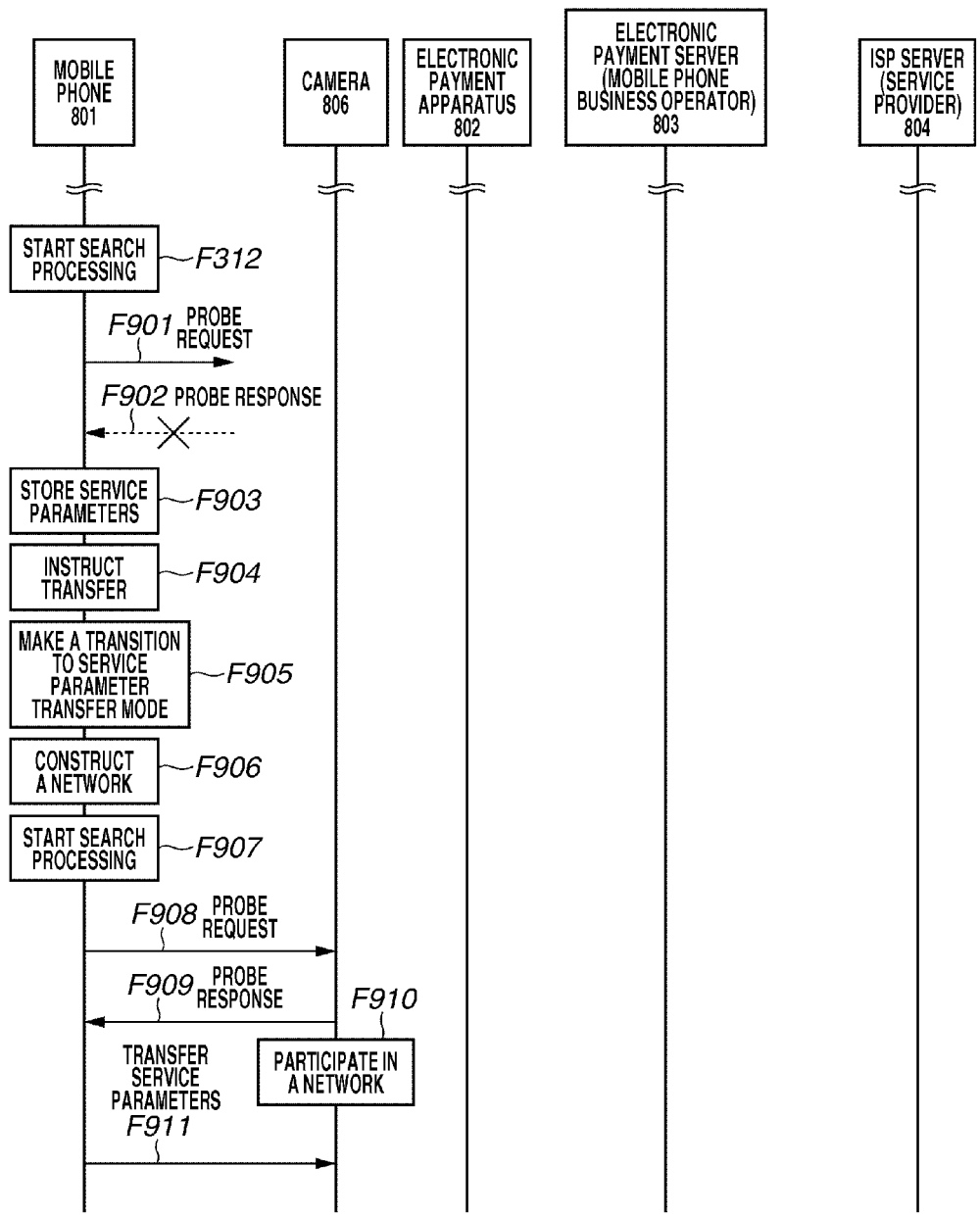
FIG. 9 illustrates a sequence according to the third exemplary embodiment.

FIG. 9 is a sequence diagram according to the present exemplary embodiment. The sequence up to step F312 is similar to that in FIG. 3, and description thereof will be omitted.

In step F901, the mobile telephone 801 transmits a Probe Request added with information indicating that the mobile telephone 801 is running the WPS, and information indicating that a role of the apparatus itself is a providing apparatus of wireless parameter. In this case, in step F902, since another wireless communication apparatus does not exist in the neighborhood, a Probe Response is not transmitted. The mobile telephone 801 determines that a communication apparatus has not participated in a network for service parameter transfer. Then in step F903, the mobile telephone 801 stores the service parameters in the storage unit 210.

In this process, in step F904, a user of the mobile telephone 801 moves to the home 805, and performs a transfer instruction of the service parameters by operating his or her mobile telephone 801. In step F905, when the above-described transfer instruction is performed, the mobile telephone 801 makes a transition to the service parameter transfer mode, and activates the WPS serving as the wireless parameter setting function. Though not illustrated, in the camera 806 too, a user performs an instruction operation for acquiring service parameters, so that the WPS is assumed to be activated. If it were a usual case, when the WPS is activated in the mobile telephone 801 and the camera 806, processing for providing wireless parameters required for performing communication between the mobile telephone 801 and the camera 806 in the ad-hoc mode is performed. On the other hand, if the WPS is activated in step F905, transfer processing of service parameters necessary for utilizing the public wireless LAN service from the camera 806 is performed.

In step F906, the mobile telephone 801, which has activated the WPS, sets a role of the apparatus itself to a providing apparatus of wireless parameters, and constructs a network for wireless parameter setting, namely, for service parameter transfer. Then in step F907, the mobile telephone 801 starts processing to search for a wireless communication apparatus in the neighborhood. In step F908, the mobile telephone 801 transmits a Probe Request added with information indicating that the mobile telephone 801 is running the WPS, and information indicating that a role of the apparatus itself is a providing apparatus of wireless parameter. In step F909, the camera 806, which has received the Probe Request, transmits a Probe Response added with information indicating that the WPS is running. The mobile telephone 101 can determine whether a wireless communication apparatus, which is running the WPS, exists, by referring to the received Probe Response. Further, in step F910, the camera 806 recognizes that the mobile telephone 801 is determined as a providing apparatus, and participates in the network that the mobile telephone 801 has constructed.

On detecting that the camera 806 has participated in the network, the mobile telephone 801 determines whether the camera 102 is a registration apparatus based on the information stored in the storage unit 210. In the present exemplary embodiment, in step F911, since the camera 806 is a registration apparatus, the mobile telephone 801 transfers the service parameters to the camera 806 using the Registration Protocol of the WPS.

Figure 10:
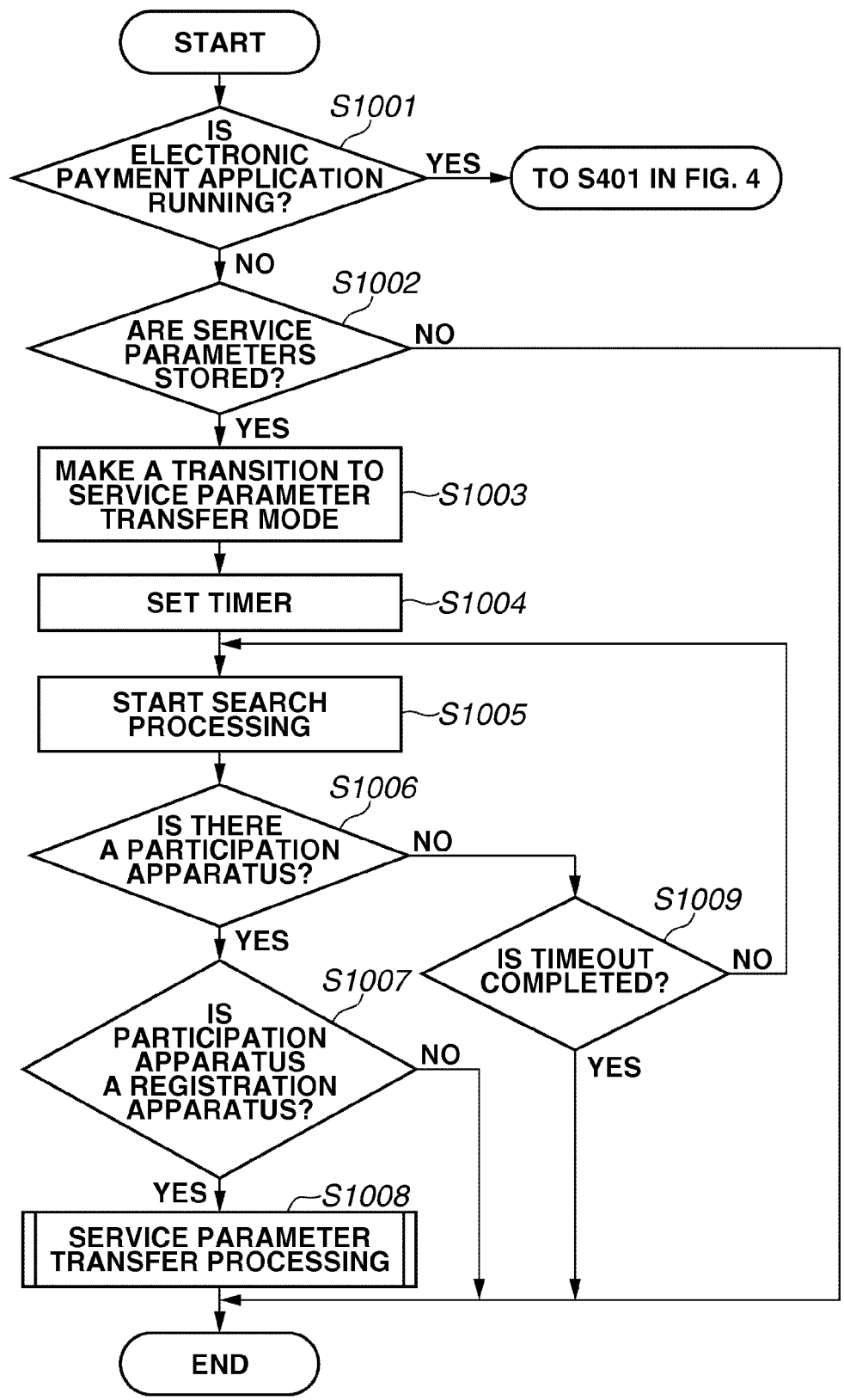
FIG. 10 is a flowchart for the mobile telephone according to the third exemplary embodiment.

FIG. 10 illustrates an operation processing flow of the mobile telephone 801 according to the present exemplary embodiment. With reference to the operation processing flow, a sequence illustrated in FIG. 9 will be described from viewpoint of an operation of the mobile telephone 801. FIG. 10 is a processing flowchart for the mobile telephone 801, which has moved to the home 805.

When a user operates the mobile telephone 801 to perform a transfer instruction of service parameters, the processing in FIG. 9 starts.

Firstly, in step S1001, the mobile telephone 801 determines whether an electronic payment application is running. If the electronic payment application is running (YES in step S1001), the processing proceeds to step S401 in FIG. 4, and performs processing described in the first exemplary embodiment. If the electronic payment application is not running (NO in step S1001), then step S1002, the mobile telephone 801 determines whether service parameters are stored in the storage unit 210. If the service parameters are not stored (NO in step S1002), the mobile telephone 801 ends the processing. If the service parameters are stored (YES in step S1002), then in step S1003, the mobile telephone 801 makes a transition to the service parameter transfer mode. Then, the mobile telephone 801 activates the WPS serving as the wireless parameter setting function. At this time, the mobile telephone 801 sets a role of the apparatus itself to a providing apparatus of wireless parameters.

In step S1004, the mobile telephone 801 sets up a timer for measuring time required to search for nearby wireless communication apparatuses. The timer may be set by a user, or may have been set in advance in the mobile telephone 801. In step S1005, the mobile telephone 801 constructs a network for wireless parameter setting, namely, for service parameter transfer, and starts processing to search for nearby wireless communication apparatuses. Then, in step S1006, the mobile telephone 801 determines whether another wireless communication apparatus has participated in the network for service parameter transfer. If the mobile telephone 801 determines that a wireless communication apparatus (hereinafter, "participation apparatus"), which has participated in the network for service parameter transfer, exists (YES in step S1006), the processing proceeds to step S1007. If the mobile telephone 801 determines that a participation apparatus does not exist (NO in step S1006), then in step S1005, the mobile telephone 801 performs search processing, until the timer, which has been set up in step S1004, expires (NO in step S1009). In step S1009, if the timer expires (YES in step S1009), with no participation apparatus detected, the mobile telephone 801 ends the processing.

In step S1007, the mobile telephone 801 determines whether the participation apparatus is a registration apparatus. A determination whether the participation apparatus is a registration apparatus, is performed by comparing information acquired from the participation apparatus with information stored in the storage unit 210. For example, the mobile telephone 801 may determine whether the pieces of identification information such as MAC addresses match with each other, or may determine whether the pieces of device type information such as cameras, PCs match with each other.

If the mobile telephone 801 determines that the participation apparatus is a registration apparatus (YES in step S1007), then in step S1008, the mobile telephone 801 performs transfer processing of service parameters to the participation apparatus. The transfer processing of the service parameters has been described in the first exemplary embodiment with reference to FIG. 11, and description thereof herein will be omitted. If the mobile telephone 801 determines that the participation apparatus is not a registration apparatus (NO in step S1007), the mobile telephone 801 ends the processing just as it is.

In this way, according to the present exemplary embodiment, even in the case where service parameters acquired by performing electronic payment processing are not immediately transferred to another communication apparatus, transfer processing can be afterward performed according to an operation of the user. Therefore, only acquisition of the service parameters is finished by performing electronic payment processing by the mobile telephone, for example, at a convenience store, and later on the service parameters can be transferred at a desired place and time.

In the above descriptions, when service parameters are acquired, the processing shifts to the service parameter transfer mode, but it is not always needed to shift to the service parameter transfer mode. When the service parameters are acquired, the service parameters may be temporarily stored within the apparatus itself without shifting to the service parameter transfer mode, and the processing may shift to the service parameter transfer mode according to an operation of the user.

In the above-described respective exemplary embodiments, although utilization of a public wireless LAN service has been described, it is possible to apply to services other than the public wireless LAN service, for example, a WEB server connection service or the like for sharing or downloading images and moving images.

Further, in the above-described respective exemplary embodiments, although transfer of service parameters using the WPS has been described, other communication parameter setting functions may be used.

Further, in the above-described respective exemplary embodiments, although the use of the NFC as the short-range wireless communication function has been described, other short-range wireless communications such as Felica (trademark), and TransferJet (trademark) may be applied.

Further, a recording medium with the program code of software for realizing the functions of the foregoing exemplary embodiments recorded thereon may be supplied to a system or an apparatus, the program code stored in the recording medium may be read out and executed by a computer (central processing unit (CPU) or micro processing unit (MPU)) in the system or apparatus. Needless to say, the objective of the present invention is thereby achieved.

As described above, according to the present exemplary embodiment, service parameters required for utilizing public wireless LAN services can be acquired in a straightforward manner.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-044199 filed Feb. 26, 2009, which is hereby incorporated by reference herein in its entirety.

What is claimed is:

1. A communication apparatus comprising:
a processor; and
a memory storing instructions that, when executed by the processor, causes the communication apparatus to:
perform electronic payment processing via a short-range wireless communication;
acquire, via the short-range wireless communication, a service parameter required for utilizing a public wireless local area network (LAN) service, by performing the electronic payment processing;
search for a second communication apparatus which is a transfer destination of the service parameter;
set a wireless parameter, which is required for direct wireless communication between the communication apparatus and the second communication apparatus without a relay of a base station, between the communication apparatus and the second communication apparatus; and
transfer the acquired service parameter to the second communication apparatus detected by the search, by setting the wireless parameter,
wherein, if the second communication apparatus is not detected, the communication apparatus utilizes the public wireless LAN service by using the service parameter.

2. The communication apparatus according to claim 1, wherein setting the wireless parameter includes providing the wireless parameter according to a predetermined protocol from an apparatus which has been determined as a providing apparatus for the wireless parameter to the second communication apparatus which has been determined as a receiving apparatus for the wireless parameter, and wherein the service parameter is transferred according to the predetermined protocol as the providing apparatus for the wireless parameter.

3. The communication apparatus according to claim 1, wherein the memory further stores instructions that, when executed by the processor, cause the communication apparatus to:
determine whether the acquired service parameter is allowed to be transferred based on restriction information if the restriction information for restricting utilization of he service parameter is added to the acquired service parameter: and
transfer the acquired service parameter based on the determination.

4. The communication apparatus according to claim 1, wherein the communication apparatus transfers the acquired service parameter by the short-range wireless communication.

5. The communication apparatus according to claim 1, wherein the communication apparatus starts transferring the acquired service parameter according to acquisition of the service parameter.

6. The communication apparatus according to claim 1, wherein the memory further stores instructions that, when executed by the processor, cause the communication apparatus to:
perform a transfer instruction of the service parameter operable by a user; and
starts transferring the acquired service parameter according to an operation of the transfer instruction.

7. A method for controlling a communication apparatus, the method comprising:
performing electronic payment via a short-range wireless communication;
acquiring, via the short-range wireless communication, a service parameter required for utilizing a public wireless local area network (LAN) service by performing he electronic payment processing;
searching for a second communication apparatus which is a transfer destination of the service parameter;
setting a wireless parameter, which is required for direct wireless communication between the communication apparatus and the second communication apparatus without a relay of a base station, between the communication apparatus and the second communication apparatus;
transferring the acquired service parameter to a second communication apparatus detected by the searching, by setting the wireless parameter; and
utilizing the public wireless LAN service by using the service parameter if the second communication apparatus is not detected.

8. A non-transitory computer-readable storage medium storing a program for causing a computer to execute a method for controlling a communication apparatus, the method comprising:
performing electronic payment processing via a short-range wireless communication;
acquiring, via the short-range wireless communication, a service parameter required for utilizing a public wireless local area network LAN service by performing the electronic payment processing;
searching for a second communication apparatus which is a transfer destination of the service parameter;
setting a wireless parameter, which is required for direct wireless communication between the communication apparatus and the second communication apparatus without a relay of a base station, between the communication apparatus and the second communication apparatus;

transferring the acquired service parameter to a second communication apparatus detected by the searching, by setting the wireless parameter; and utilizing the public wireless LAN service by using the service parameter if the second communication apparatus is not detected.

9. The communication apparatus according to claim 1, wherein the public wireless LAN conforms to Institute of Electrical and Electronics Engineers (IEEE) 802.11.

10. The communication apparatus according to claim 1, wherein the wireless parameter comprises at least one of network identifiers, frequency channels, an encryption key, and an authentication key.

11. The communication apparatus according to claim 1, wherein the wireless parameter comprises at least one of network identifiers for communication conforming to Institute of Electrical and Electronics Engineers (IEEE) 802.11, frequency channels for communication conforming to IEEE802.11, an encryption key for communication conforming to IEEE802.11, and an authentication key for communication conforming to IEEE802.11.

12. The communication apparatus according to claim 1, wherein the communication apparatus comprises a mobile telephone.

13. The communication apparatus according to claim 1, further comprising:

a first wireless communication unit which communicates by the short-range wireless communication; and a second wireless communication unit which communicates by setting the wireless parameter.

* * * * *